United States Patent [19]

Crawford

[11] 4,053,566
[45] Oct. 11, 1977

[54] METHOD OF MAKING DIAMMONIUM HYDRAZINIUM TETRAPERCHLORATE

[75] Inventor: Theodore C. Crawford, Yuma, Ariz.

[73] Assignee: Thiokol Corporation, Newtown, Pa.

[21] Appl. No.: 618,017

[22] Filed: Sept. 30, 1975

[51] Int. Cl.$^2$ .................. C01B 21/20; C01B 21/52
[52] U.S. Cl. ................................ 423/386; 423/385; 423/413; 149/75
[58] Field of Search .............. 423/385, 386, 351, 356, 423/413; 149/75, 76

[56] References Cited

U.S. PATENT DOCUMENTS

| 3,131,997 | 5/1964 | Stern | 423/386 |
| 3,436,172 | 4/1969 | Paustian et al. | 423/386 |
| 3,450,492 | 6/1969 | Weinberg et al. | 423/386 |
| 3,743,701 | 7/1973 | Crawford et al. | 423/386 |
| 3,769,389 | 10/1973 | Paustian | 423/386 |

*Primary Examiner*—O. R. Vertiz
*Assistant Examiner*—Eugene T. Wheelock

[57] ABSTRACT

Diammonium hydrazinium tetraperchlorate is made by reacting an ammonium compound and a hydrazinium compound preferably in a 2:1 molar ratio with perchloric acid using aqueous perchloric acid containing about 60% to 70% by weight of the acid as a reaction medium. The diammonium hydrazinium tetraperchlorate crystallizes from the solution and may be recovered therefrom by filtration, decantation or centrifuging. The tetraperchlorate formed is useful as the oxidizer component of solid rocket propellants, pyrotechnic compositions and gas generators.

9 Claims, No Drawings

METHOD OF MAKING DIAMMONIUM HYDRAZINIUM TETRAPERCHLORATE

This invention relates to a novel and improved method of making diammonium hydrazinium tetraperchlorate, a compound that is especially useful as an oxidizer in the manufacture of solid propellants for rockets and may also be used as an oxidizer in gas generators, pyrotechnic compositions and the like.

The currently most widely used type of solid rocket propellant comprises essentially a dispersion of finely divided inorganic oxidizer particles in an elastomeric fuel-binder. Such propellants are commonly made by mixing a major amount of the finely divided oxidizer with a minor amount of liquid, curable organic polymer, a curing agent for the organic polymer and small amounts of certain special purpose additives. The resulting mixture is heated to an elevated temperature to cause the polymer to be cured to elastomeric form with the oxidizer dispersed therethrough.

The thrust that a given rocket structure develops depends importantly on the specific impulse of the propellant used therein, and the specific impulse in turn depends importantly on the nature of the oxidizer employed. Because it possesses a useful combination of properties for propellant applications, ammonium perchlorate has been widely used as a propellant oxidizer.

While propellents made with ammonium perchlorate have a relatively high specific impulse, still higher specific impulses are desired, and various more powerful oxidizers have been proposed to achieve this objective. Thus it has been proposed that hydrazinium diperchlorate or diammonium hydrazinium tetraperchlorate, both of which yield exceptionally high burning rate propellants, be used in place of ammonium perchlorate. However, hydrazinium diperchlorate is quite hygroscopic and therefore difficult to handle during compounding. Also propellant compositions made therefrom tend to absorb moisture, even at quite low relative humidities.

Diammonium hydrazinium tetraperchlorate (DAHTP) has considerable potential as a propellant oxidizer since it yields propellants having a higher specific impulse than ammonium perchlorate and is less hygroscopic than hydrazinium diperchlorate. It is also compatible with the commonly used organic polymer fuel-binders. However, the lack of a commercially attractive process for producing DAHTP has militated against its acceptance as a propellant oxidizer. More particularly, DAHTP has heretofore been made by reaction of hydrazinium halides with ammonium perchlorate and hydrogen fluoride, using anhydrous hydrogen fluoride as a reaction medium. A process of this type is disclosed in U.S. Pat. No. 3,743,701. While acceptable yields of the tetraperchlorate can be obtained by this process, anhydrous hydrogen fluoride, because of its corrosiveness and toxicity, is a difficult material to work with, especially in a large scale manufacturing operation.

It is accordingly an object of the present invention to provide an improved process for making diammonium hydrazinium tetraperchlorate. It is another object of the invention to provide a method of making DAHTP without using corrosive reagents or reaction media such as hydrogen fluoride. It is still another object of the invention to provide a simple and economical method of making DAHTP in good yield. Other objects of the invention will be in part obvious and in part pointed out hereafter.

The present invention is based on the discovery that diammonium hydrazinium tetraperchlorate $[(NH_4)_2N_2H_6(ClO_4)_4]$ can be made in good yield by reacting an ammonium compound and a hydrazinium compound with perchloric acid in aqueous perchloric acid as a reaction medium. The preferred ammonium compounds are the perchlorate, the hydroxide and the halides, e.g., the chlorides or the fluorides. The preferred hydrazinium compounds are the hydroxides and the halides. Typical embodiments of the process may be represented by the following equations:

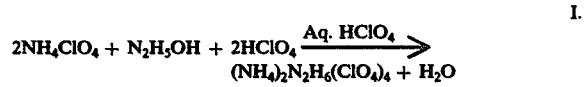

I.

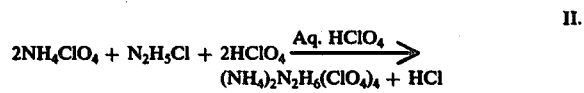

II.

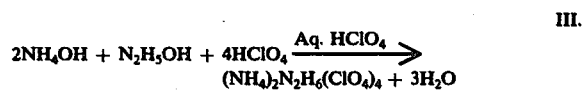

III.

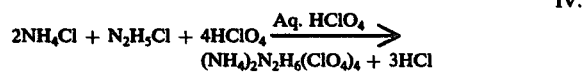

IV.

From a comparison of equations I and II with equations III and IV it is apparent that when ammonium perchlorate is used as the ammonium compound, only half as much perchloric acid is required. Since perchloric acid is relatively expensive, the use of ammonium perchlorate as the ammonium salt is preferred. Also the reactions of equations I and II produce less of the by-product HCl or water. Moreover, the reactions of equations I and III are preferred over those of equations II and IV since the former reactions produce only the desired product and water.

In a preferred embodiment of the process an aqueous solution of the ammonium and hydrazinium compounds is prepared containing a 2:1 molar ratio of ammonium compound to hydrazinium compound, and this solution is added slowly at ambient temperature to relatively concentrated aqueous perchloric acid, i.e., a solution containing from about 60% to 70% by weight of the acid. The use of a concentrated acid is important in preventing decomposition of the tetraperchlorate by hydrolysis.

The perchloric acid is both a reactant and a reaction medium. As indicated by the above equations, if an ammonium salt other than ammonium perchlorate is used, two moles of perchloric acid per mole of ammonium compound are stoichiometrically required to produce the desired product, whereas if ammonium perchlorate is used, only one mole of the acid is required. In either event a substantial excess of the acid is used to provide a reaction medium for carrying out the reaction. In most cases the quantity of aqueous acid used should be such as to provide a perchloric acid/ammonium compound molar ratio of say 10:1 to 60:1.

The amount of ammonium compound and hydrazinium compound used in preparing the aqueous solution that is added to the perchloric acid may be varied over a relatively wide range from say 1% by weight to the saturation values of the compounds. While the ammonium and hydrazinium compounds are desirably used in the stoichiometrically required 2:1 ratio, this ratio may, if desired, be varied over a wide range. The stoichiometric ratio is merely a convenient ratio to use.

It has been found that when the ammonium compound/hydrazinium compound solution is added to the perchloric acid at ambient temperature, a certain amount of finely divided solid product (DAHTP) comes out of solution. To produce DAHTP having relatively large crystals it is desirable, after mixing of the two solutions has been completed, that the mixture be heated to an elevated temperature, say 80° to 95° C., whereupon the separated solid product re-dissolves. Thereafter the solution is cooled, with stirring, to ambient temperature or lower under such conditions as to cause the tetraperchlorate to crystallize in relatively large crystals. The crystals can be separated from the solution in any suitable manner such as by filtration, decantation or centrifuging. If small crystals are desired, the heating step can be omitted and the mixture cooled below ambient temperature to produce additional fine crystals that are then separated from the mother liquor.

In order to point out more fully the nature of the present invention, the following specific Examples are given illustrating preferred embodiments of the invention.

EXAMPLE 1

Two grams of $N_2H_6Cl_2$ and two grams of $NH_4Cl$ were dissolved in 25 ml. of $H_2O$. This solution was added dropwise to 200 ml. of 70% $HClO_4$. This solution was heated to 86° C. to dissolve all solids and thereafter cooled. Upon cooling, crystals reappeared at 79° C. The solution was further cooled to 40° C. with continuous stirring. The crystals of DAHTP were separated from the solution by filtration, dried and analyzed.

Analysis: 6.83% hydrazine, 7.22% $NH_3$;
Theoretical: 6.85% hydrazine, 7.28% $NH_3$;
% DAHTP by hydrazine analysis 99.7%;
% DAHTP by $NH_3$ analysis 99.2%.

EXAMPLE 2

To a five-gallon reactor containing 14.3 liters of 70% by weight $HClO_4$ one liter of $H_2O$ was added. One liter of a solution containing 83 ml. hydrazine (54% $N_2H_4$) and 175 ml. $NH_4OH$ (28% $NH_3$) was added dropwise to the perchloric acid solution. The temperature at the start of addition was 26° C. and at the end of addition was 30° C. The solution was heated to 91° C. to dissolve precipitated solids and then cooled to 0° C. to precipitate DAHTP crystals. Stirring was continuous during the whole operation. The crystals were separated from the solution to yield 500 grams of DAHTP.

EXAMPLE 3

To a solution of 43.5 grams of $NH_4ClO_4$ in 185 grams of water 9.25 grams of $N_2H_5OH$ was added. 2200 grams of 70% aqueous $HClO_4$ was heated to 63° C. and the $NH_4ClO_4/N_2H_5OH$ solution was added thereto dropwise over a period of 4 hours and 23 minutes.

The solution was then permitted to cool to about 25° C. During the cooling process crystals of DAHTP formed and the crystals were separated by filtration. Drying of the crystals was effected by heating them under nitrogen at 60° C. The yield was 98% DAHTP.

EXAMPLE 4

A solution was prepared by dissolving 71 lbs. of ammonium perchlorate and 27.6 lbs. of hydrazine in 301 lbs. of water. 39.0 lbs. of a 70% aqueous solution of perchloric acid was heated to 61° C. and the perchlorate/hydrazine solution was added thereto over a period of 1 hour and 40 minutes. The reaction mixture was then cooled to about 0° C. to crystallize DAHTP therefrom.

The crystals were separated by filtration and 222 lbs. of wet cake was recovered. Analysis of the product showed 83.65% DAHTP based on hydrazine content and 86.26% based on ammonia content.

The DAHTP as thus prepared can be substituted for ammonium perchlorate in conventional solid propellant compositions to yield stable propellants having good physical properties and a relatively high specific impulse.

It is, of course, to be understood that the foregoing description is intended to be illustrative only, and that numerous changes can be made in the ingredients, proportions and conditions disclosed without departing from the spirit of the invention as defined in the appended claims.

I claim:
1. A method of making diammonium hydrazinium tetraperchlorate which comprises reacting an ammonium compound selected from the ammonium halide, ammonium hydroxide and ammonium perchlorate and a hydrazinium compound selected from the hydrazinium halides and hydrazinium hydroxide with perchloric acid in an aqueous perchloric acid solution containing from about 60% to 70% by weight of perchloric acid to form diammonium hydrazinium tetraperchlorate and recovering the diammonium hydrazinium tetraperchlorate from said solution.

2. A method according to claim 1 wherein said ammonium compound is ammonium chloride and said hydrazinium compound is hydrazinium chloride.

3. A method according to claim 1 wherein said ammonium compound is ammonium hydroxide and said hydrazinium compound is hydrazinium hydroxide.

4. A method according to claim 1 wherein said ammonium compound is ammonium perchlorate and said hydrazinium compound is hydrazinium hydroxide.

5. A method according to claim 1 wherein said ammonium compound is ammonium perchlorate and said hydrazinium compound is hydrazinium chloride.

6. A method according to claim 1 wherein the ratio of ammonium compound to hydrazinium compound is about 2:1.

7. A method according to claim 1 wherein the molar ratio of perchloric acid to ammonium compound in said solution is from about 10:1 to about 60:1.

8. A method of making diammonium hydrazinium tetraperchlorate which comprises preparing an aqueous solution of an ammonium compound selected from ammonium halides, ammonium hydroxide and ammonium perchlorate and a hydrazinium compound selected from hydrazinium halides and hydrazinium hydroxide, adding said solution to aqueous perchloric acid containing about 60% to about 70% by weight of said acid, heating the solution to dissolve solid material formed therein, thereafter cooling said solution to precipitate crystals of diammonium hydrazinium tetraperchlorate and recovering the crystalline diammonium hydrazinium tetraperchlorate from said solution.

9. A method according to claim 8 wherein the molar ratio of ammonium compound to hydrazinium compound is about 2:1 and the molar ratio of perchloric acid to ammonium compound is about 10:1 to about 60:1.

* * * * *